(12) United States Patent
Andersson et al.

(10) Patent No.: US 7,200,768 B2
(45) Date of Patent: Apr. 3, 2007

(54) SYNCHRONOUS DATA TRANSFER SYSTEM FOR TIME-SENSITIVE DATA IN PACKET-SWITCHED NETWORKS

(75) Inventors: Leif Arne Jorgen Andersson, Kungsängen (SE); John Fullemann, Spanga (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/519,596

(22) PCT Filed: Jul. 10, 2002

(86) PCT No.: PCT/EP02/07699

§ 371 (c)(1),
(2), (4) Date: Dec. 28, 2004

(87) PCT Pub. No.: WO2004/008703

PCT Pub. Date: Jan. 22, 2004

(65) Prior Publication Data

US 2005/0232307 A1    Oct. 20, 2005

(51) Int. Cl.
*G06F 1/12* (2006.01)
(52) U.S. Cl. .................. 713/400; 713/401; 713/500
(58) Field of Classification Search ............ 713/375, 713/400, 401, 500, 501, 502, 600, 601
See application file for complete search history.

(56) References Cited

U.S. PATENT DOCUMENTS

| | | | | |
|---|---|---|---|---|
| 3,651,474 A * | 3/1972 | Liberman | ............. | 375/356 |
| 5,610,921 A * | 3/1997 | Christensen | ............. | 370/395.4 |
| 5,638,356 A * | 6/1997 | Hijikata | ............. | 370/395.51 |
| 6,239,720 B1 * | 5/2001 | Kim et al. | ............. | 340/5.1 |
| 6,259,683 B1 | 7/2001 | Sekine et al. | | |
| 6,493,832 B1 * | 12/2002 | Itakura et al. | ............. | 713/600 |

(Continued)

FOREIGN PATENT DOCUMENTS

WO    WO 9430024 A    12/1994

(Continued)

OTHER PUBLICATIONS

European International Search Report for PCT/EP02/07699, dated Mar. 28, 2003.

*Primary Examiner*—Thomas Lee
*Assistant Examiner*—Malcolm Cribbs
(74) *Attorney, Agent, or Firm*—Roger S. Burleigh

(57) ABSTRACT

A transmission arrangement and method permits time-sensitive data to be transmitted through a packet-switched network and arrive synchronously at separate end points without synchronising all payload carrying nodes in the network. This is achieved by propagating a timing reference through the network from the sending node to the end nodes, each end node adjusting that phase of its local frequency generator to this timing reference. The sending node then sends data structure information to the end nodes, enabling the end nodes to regenerate the timing and structure of the synchronous data stream. Finally delay information is sent to each end node that allows the end nodes to adjust the start of synchronous data transmission by an amount such that all will commence transmission substantially simultaneously. With this information the end nodes independently recreate a signal in synchronisation. This solution has the advantage that the network infrastructure can remain substantially unchanged, although the timing sensitive application can treat the network as if it were a synchronised network.

21 Claims, 4 Drawing Sheets

U.S. PATENT DOCUMENTS

| | | |
|---|---|---|
| 6,601,195 B1 * | 7/2003 | Chirashnya et al. .......... 714/43 |
| 6,765,974 B1 * | 7/2004 | Bukris et al. ............... 375/354 |
| 2001/0030978 A1 | 10/2001 | Holloway et al. |
| 2002/0054589 A1 | 5/2002 | Ethridge et al. |
| 2002/0101835 A1 * | 8/2002 | Gerakoulis .................. 370/329 |
| 2002/0129095 A1 * | 9/2002 | Hatalkar ..................... 709/203 |
| 2003/0074256 A1 * | 4/2003 | LaCroix ...................... 705/14 |
| 2003/0102933 A1 * | 6/2003 | Partanen ..................... 333/18 |
| 2004/0011868 A1 * | 1/2004 | Backlund et al. ........... 235/383 |
| 2004/0105388 A1 * | 6/2004 | Wilkins et al. ............. 370/235 |
| 2005/0042211 A1 * | 2/2005 | Kenoyer et al. ........... 424/94.3 |
| 2005/0272366 A1 * | 12/2005 | Eichinger et al. ............... 455/9 |

FOREIGN PATENT DOCUMENTS

| | | |
|---|---|---|
| WO | WO99 65196 A | 12/1999 |

* cited by examiner

SYNCHRONOUS DATA TRANSFER SYSTEM FOR TIME-SENSITIVE DATA IN PACKET-SWITCHED NETWORKS

FIELD OF INVENTION

The invention relates to the transmission of data in time-sensitive applications over packet-switched networks and has particular relevance to asynchronous networks.

BACKGROUND ART

Asynchronous broadband networks using packet-switched technology, such as the Ethernet, are extremely robust and reliable for the transmission of data. This robustness is in part a feature of asynchronous operation, because each node in the network is able to operate independently of other nodes and consequently high performance timing components for communication between nodes are not required. The increasing availability of these broadband networks has provoked interest in using such networks to transfer applications with strict timing requirements, such as voice or video. Mobile telephony in particular is a likely candidate in view of the widespread availability of these types of networks. However, these real-time applications impose low round-trip delays on the network. For example in voice communication, round trip delays in excess of around 100 ms are disconcerting to the user, as any delay is perceived as a pause in the conversation. Synchronous operation is also essential, for example to ensure that voice and image components of video data arrive together and also so that radio base stations are able to transmit data simultaneously.

Present day solutions to this problem include installing high performance oscillators serving as clock signal generators in the access nodes and synchronising these oscillators with an external clock source, for example using an IP-based timing protocol such as NTP (Network Timing Protocol). However, in addition to the expense required in modifying the access nodes, the time required to synchronise end nodes to a master node network start-up time and reset or failure recovery is very long when NTP is used, typically of the order of several hours if not days. In addition, the attendant increase in complexity and sophistication of the access nodes inherently changes the nature of the packet-switched network and makes it more susceptible to breakdown.

There is thus a need for enabling the reliable transmission of real-time or time-sensitive applications over existing packet switched networks that obviates the extensive modifications in the network infrastructure and enables rapid network start-up and recovery times.

SUMMARY OF THE INVENTION

The above objects are achieved in an arrangement and method as defined in the independent claims.

In particular, a data transmission link is proposed for transmitting time-sensitive data, which includes a first node connected to a plurality of end nodes by a broadband packet-switched network and at least one end terminal located outside the network connected to each end node. Each end node includes timing generation circuitry for generating an output timing signal that is phase locked to a received reference timing signal originating at the first node. The end nodes also include means for receiving data structure information from the first node. Using this data structure information, the end nodes identify the data structure format for transmitting time-sensitive data on to the end terminals. The end nodes also include a delay signal generator for generating a delay signal in response to delay information received from the first node. This delay signal is preferably set to represent the worst-case transmission delay between the first node and any end node. The end nodes further include a data converter that communicates receives the delay signal from the delay signal generating means, the data structure from the data structure receiving means and the timing signal from the timing generation circuitry. This data converter is arranged to receive payload data from the first node through the packet-switched network and retransmit this payload data in a synchronous manner to the respective end terminal. The data converter adjusts the timing of the payload data transmission in each end node on the basis of the received timing signal, the received data structure format and the received delay signal, such that all end nodes transmit the payload data substantially simultaneously. The invention further resides in a node adapted to operate as an end node in this link.

In accordance with the present invention a method is also proposed for transmitting time-sensitive data through a packet-switched network between a first node and a plurality of end nodes, each end node being connected to at least one end terminal located outside the network. The method includes the following steps: propagating a timing signal through the network from the first node to each of the end nodes and transmitting a signal indicative of a data structure type from the first node to each end node. The data structure type identifies the data format to be used for transmission from the end nodes to the end terminals. The method continues with the step of transmitting a delay figure from the first node to each end node, where this delay figure is indicative of the maximum transmission delay between the first node and any one of the end nodes. Finally payload data is transmitted between the first node and the end terminals, whereby payload data transmitted between each end node and the corresponding end terminal is formatted in the identified data structure format in accordance with said timing signal and adjusted in dependence on said delay figure such that payload data transmission from each end node to each end terminal occurs substantially synchronously.

The proposed solution does not require the active synchronisation of the master and end nodes. Instead, only the characteristics or qualities of the clock signal used at the transmitting node are distributed to the end nodes in the network. These nodes then use this information to regenerate synchronous signals. The remaining information required for synchronised transmission, namely the data format, i.e. the structure and timing of the data to be transmitted as well as the delay information necessary to adjust the data structure timing is simply sent to the end nodes through the network. The end nodes thus independently recreate a signal in synchronisation. This solution has the advantage that the network infrastructure can remain substantially unchanged, although the timing sensitive application can treat the network as if it were a synchronised network.

BRIEF DESCRIPTION OF THE DRAWINGS

Further objects and advantages of the present invention will become apparent from the following description of the preferred embodiments that are given by way of example with reference to the accompanying drawings. In the figures.

DETAILED DESCRIPTION OF THE DRAWINGS

This invention will be described in the following with specific reference to Fast Ethernet (also known as 100Base-T Ethernet) and Gigabit Ethernet, however it should be understood that the invention is not limiting to the Ethernet, but may equally be applied to other packet-switched networks.

Figure 1:
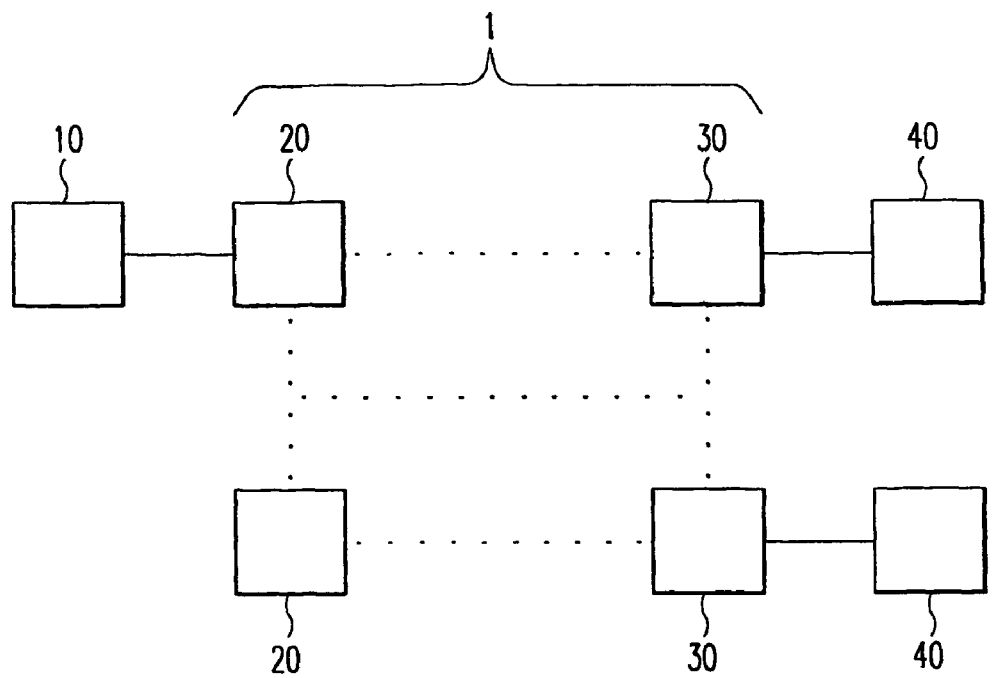
FIG. 1 is a functional block diagram of a network in accordance with the invention.

FIG. 1 is a block diagram of a communications link over an Ethernet network structure 1 used to illustrate the invention. The link is between a master node 10, which is in the network 1, and several terminating nodes 40, which are outside the network 1 and access the network 1 through network end nodes 30. A number of intermediate nodes 20 may be connected between the master node 10 and network end node 30. Data transmitted by the master node 10 to the terminating node 40 is transmitted across the network 1 in packetized units.

In packet-switched networks such as the Ethernet, nodes operate independently of one another. Operation between nodes is not synchronised and for this reason local frequency generators that generate the node internal clocks can be relatively low performance, low cost oscillators. For real-time or time-sensitive applications such as mobile telephony, synchronisation between different elements is vital. For example when a mobile phone is being paged, a paging signal must be transmitted by several radio base stations (RBS) simultaneously. Transmitting such a paging signal to several radio base stations through the Ethernet will not guarantee synchronous transmission from each end node connected to an RBS.

In accordance with the present invention, synchronous transmission in a packet-switched network from several end nodes is made possible, without altering the inherent asynchronous infrastructure of the network.

Synchronisation is achieved not by actively synchronising the operation of all nodes to an external clock signal. Instead, each end node is provided with the necessary information to regenerate a synchronous signal. This can be summarised in three steps:

The first step is to distribute the attributes of the master node clock signal to each end node 30 through the network. In this document, the term attribute is intended to mean the jitter and stability of the clock signal, not necessarily the clock frequency. The second step is to identify the structure of the payload data that must be regenerated at the end node 30 for transmission on to the terminating node 40, including providing the end node with a marker relative to which transmission must be started. The third step is to set a transmission delay between the master node and each end node that can be used by each end node 30 to adjust the start of data regeneration and transmission. When each end node 30 is in possession of this information it is able to regenerate a payload signal that will be synchronised with all other end nodes 30. It will be appreciated that these three steps may be performed in any order. However, the end node 30 must have received all the necessary information before payload transmission commences.

In accordance with the preferred embodiment of the present invention, the distribution of the master clock attributes to the end nodes 30 is achieved by propagating a reference signal of constant frequency from the master node through each node 20, 30 within a defined path to the terminating node 40. It is assumed that the master node 10 has a high performance oscillator and is consequently able to generate a reference signal of constant frequency with minimal jitter and high stability. This reference signal can be contained in all messages from the master node. During normal operation the transmission link from the master node 10 downwards is always transmitting. If no payload data is available and idle pattern is transmitted, which generates an accessible clock signal on the link. It will be appreciated that only those nodes 20, 30 within the link between the master node 10 and terminating end nodes are required to identify and propagate the master clock attributes. For this reason a master controlled distribution network is preferably defined within the packet switched network 1 to include specific nodes 20 and paths between the master node 10 and defined network end-point nodes 30. This distribution network may consist of defined individual paths between the master and end nodes 10, 30. Alternatively, the synchronous transmission paths may be set-up dynamically, with changes in transmission paths implemented automatically. This implies the software controlled path allocation in each node that is controlled by the master node 10.

The propagation of the constant-frequency reference signal is achieved by each intermediate node 20 in any one path between the master node 10 and end node 30 phase locking its internal clock generator to the received reference signal. Any generated output signal will thus carry the jitter and stability of the clock reference signal on to the next node 20, 30.

Figure 2:
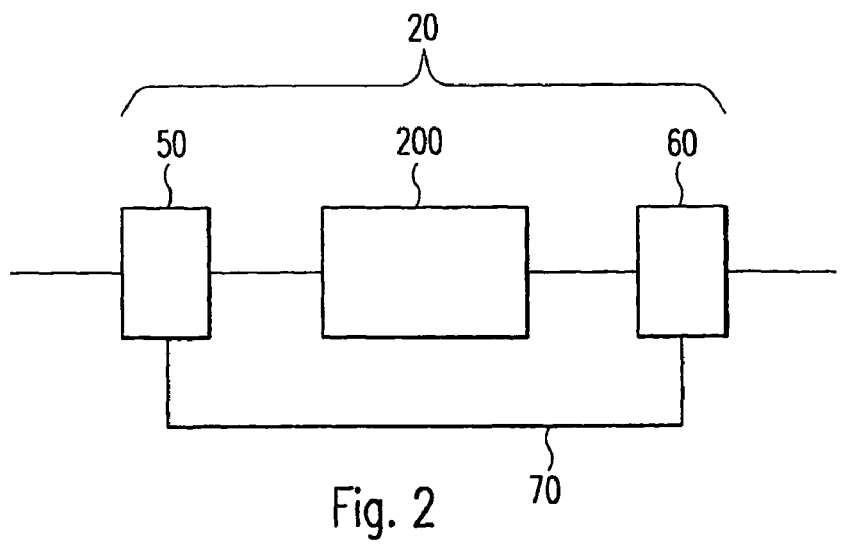
FIG. 2 is a block diagram illustrating the functional elements of an intermediate or end node in the network arranged to propagate a reference signal, FIG. 2a schematically illustrates details of phase adjustment circuitry of the circuit of FIG. 2.
Figure 2A:
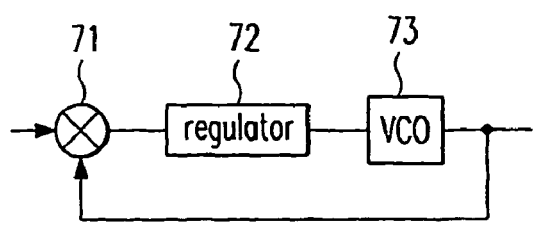

FIG. 2 illustrates a node arranged to receive and transmit the attributes of a reference signal that originates in the master node. It should be understood that this arrangement is the same in both the intermediate 20 and end nodes 30 of the network, however, for the sake of simplicity, FIG. 2 will be described with specific reference to an intermediate node. In the block diagram of FIG. 2, the node 20 comprises three parts, a reference extraction unit 50, the body of the node 200 and a reference adjustment unit 60 for imposing the attributes of the reference signal on the output signal, or rather phase locking the output frequency to the reference signal. The body of the node 200 represents a conventional node in the package switched network. Its structure is thus well known in the art and will not be described in detail here. The extraction unit 50 and adjustment unit 60 are new elements connected to the input and output of the node 200, respectively. The extraction unit 50 is connected between the input path and the node, while the adjustment unit 60 is connected between the node and the output path or downlink. A bypass connection 70 connects the extraction unit 50 directly to the adjustment unit 60. In operation, the extraction unit 50 extracts the clock reference signal contained in the input signal and passes this to the adjustment unit 60 through connection 70. The input information is relayed directly to the node body 200. Any output information from the node body 200 is sent via the adjustment unit 80, which imposes the attributes of the received reference signal onto the output signal before this is sent onto the downlink. The adjustment unit 80 is preferably implemented using phase lock loop (PLL) circuitry as illustrated schematically in FIG. 2*a*. FIG. 2*a* illustrates the phase adjustment circuitry represented by the bypass link 70 in FIG. 2. This phase adjustment circuitry is a phase lock loop with a comparator 71 that receives the extracted reference timing frequency and compares this with an adjusted feedback signal. The result of the comparison is passed on to a regulator 72 that controls a voltage-controlled oscillator 73 in dependence on the comparator signal. The principle of operation of a phase lock loop is well known to those skilled in the art and will not be described in more detail here.

It will be appreciated that there is no need for the frequency of the output signal to be the same as the input reference signal. This adjustment merely synchronises the signals such that the clock transitions of one of the signals correspond with clock transitions in the other.

FIG. 2 illustrates the circuitry necessary for one-way transmission through the node 20 or 30. It will be appreciated, however, that identical circuitry will be present for transmission in the opposite direction to enable bi-directional propagation of the reference signal attributes.

While the extraction and adjustment parts 50, 60 may be separate units to permit connected to existing conventional nodes it is of course possible to incorporate the functionality of these elements within a node structure.

Figure 3:
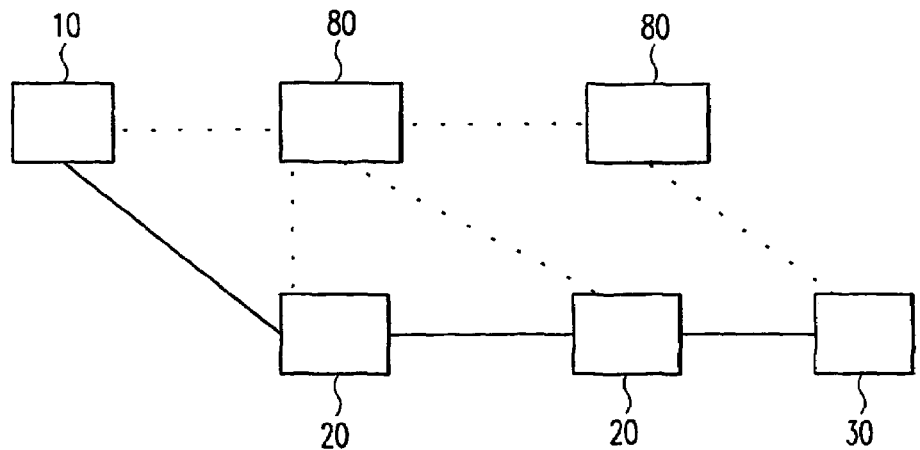
FIG. 3 is a block diagram of an alternative arrangement for propagating a reference signal in accordance with the present invention.

Propagating the attributes of a reference signal using an intermediate node 20 as shown in FIG. 2 has the advantage that only minimal modifications need be made to the network. In an alternative embodiment, the frequency generators in each node 20, 30 may be locked to an external reference signal such as a link port. This is illustrated schematically in FIG. 3. FIG. 3 illustrates a unidirectional transmission or payload path from the master node 10 through two intermediate nodes 20 to an end node 30. A second path is illustrated by a dashed line in the upper half of FIG. 3. This second path is used to propagate a master clock signal. At intervals along this second path are disposed clock regeneration nodes 80. The nodes 20 in the transmission path are conventional nodes in the network with an internal frequency generator but including an adjustment unit similar to that described with reference to FIG. 2. Each of the intermediate nodes 20 and the end node 30 is connected to the master clock reference signal at a regeneration node 80. When a node 20, 30 is set up to transmit time-sensitive or real-time applications, it will use the external master clock signal to modify the transmission clock rates.

It will be understood that the data transmission path and the master clock transmission path may have different clock rates. For example the clock regeneration path may carry a master clock signal at 1.25 GHz, while the transmission path carries data at 100 Mb/s. As in the embodiment illustrated in FIG. 2, the master clock signal need not be replicated in the nodes 20, 30; the nodes are merely phase locking the internal clock signal to the master clock signal to generate the required transmission rates.

In any packet-switched network that normally handles asynchronous data there is no need for the output signal frequency to be phase locked to any reference, the required hardware modifications can thus be made only to those intermediate nodes 20 and end nodes 30 that are defined in the synchronous link.

The distribution of the master clock attributes to each of the network end-point nodes 30 ensures that each end node 30 is able to transmit payload data with the required frequency with acceptable jitter and frequency stability. However, the reference clock signals received by each end node 30 will not be synchronised due to the different latencies of the transmission paths.

Figure 4:
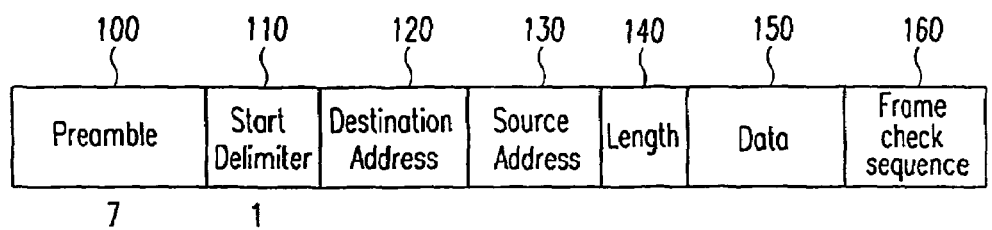
FIG. 4 illustrates the frame structure of an Ethernet frame

In order to transmit data in a synchronous fashion in accordance with the present invention, the end nodes 30 are provided with a means of identifying the required TDM data structure for transmitting the payload data on to the terminating node 40, for example a RBS, and also a means of identifying a marker indicative of the absolute start of transmission. This marker is used by the node 30 as an absolute reference point relative to which regeneration of the required transmission frequency and transmission of the regenerated payload data is to start. In the preferred embodiment, this information is incorporated in the frame or data unit transmitted. FIG. 4 shows a conventional Ethernet frame structure as defined in the IEEE 802.3 standard. The frame is made up of a number of fields, each with a defined number of bytes. The frame commences with a 7-byte preamble 100, which is followed by a 1-byte start frame delimiter 110 that serves to indicate the start of the frame. In Fast Ethernet and Gigabit Ethernet, these seven preamble bytes 100 are not defined for any specific purpose. The next fields include the destination address 120, source address 130 and length count 140. The data field 150 then follows, which may contain padding bytes if the data transmitted uses fewer bytes than the minimum specified. The frame terminates with a frame check sequence 160. The function of these fields is well known in the art and will not be described in further detail.

Figure 5:
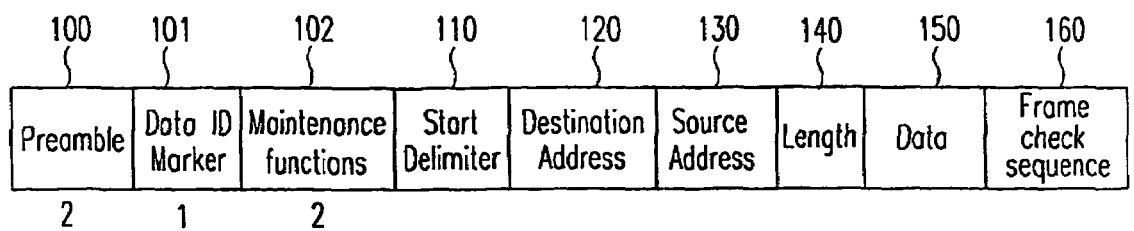
FIG. 5 illustrates a modified frame structure in accordance with the present invention

A modified frame in accordance with the present invention is illustrated in FIG. 5. This frame structure is identical to that described with reference to FIG. 4, with the exception of the preamble field 100. In this frame the preamble 100 is reduced to four bytes. The remaining three bytes serve to provide the necessary information to the end nodes concerning the transmission of time-sensitive or real-time data. Specifically, a data structure field 101 is used for identifying the required data structure and to indicate data transmission start. It is also used to carry messages between the master 10 and end nodes 30 concerning transmission delay as will be explained in further detail below. The data structure identifier 101 is a code identifying the data format that is to be regenerated in the network end point 30 and used to carry the payload data to terminating point 40. For example if the terminating end point 40 is a PABX with a single E1 connection to the end node 30 so that E1 data is to be tunnelled through the network 1, the data structure identifier 101 will indicate to the end node 30 that the structure is a frame comprising 32 8-bit PCM channels transmitted every 125 μs to form a 2048 Mb/s bit stream. The data structure identifier could also indicate to the end node 30 in what structure this payload data will be transmitted from the master node 30 through the network 1 to enable the end node 30 to perform the necessary regeneration from one structure to the other.

As mentioned above, a data structure identifier carried in the data structure field 101 may indicate both the structure, i.e. frame length, payload length, preamble length, etc, as well as the frequency with which these frames will be transmitted. In an alternative embodiment, the frequency of the data may be transmitted actively by the master node 10 to the end nodes 30. This is achieved by the master node 10 transmitting a burst of information units, typically protocol frames, which are repeated at a designated frequency that is linked to the required transmission frequency of the synchronous data from end nodes 30 to the terminating nodes 40. For example, if payload data is to be transmitted to terminating nodes in the E1 format of 32 PCM channels transmitted every 125 µs, the information units transmitted by the master node 10 are transmitted at a repetition rate of 8 kHz, or a multiple thereof. The information units, or protocol frames, transmitted in this burst are preferably identified as timing frames. This may be achieved by placing a timing code in the data structure field 101. At the receiving end, the end nodes 30 measure the interval between data units or frames. This is usefully done by marking the beginning of each frame in conjunction with the adjusted clock signal, for example on a rising edge of the clock signal, and starting a counter in conjunction with the adjusted clock signal, which is then stopped when the next frame arrives to generate a periodic marker T. This periodic marker T is then used to identify payload data received over the network 1 that should be assigned to one time frame or data unit over the synchronous link to the terminating end node 40. The marker is essentially an indicator of absolute transmission start. It is used to identify data for packing into the first time frame of the synchronised data structure. After this point all received data is packed into subsequent frames as they are transmitted through the network. In each node the transmission start will be adjusted relative to the calculated marker according to delay information that is described in more detail below.

The remaining two bytes are used for maintenance information 102. These bytes are used after the synchronous data link has been set-up through the network 1. This field has three main functions: it is used to enable a link restart; it is used to communicate a change in data structure and it is also used to enable verification of the start of transmission marker. With regard to the physical level of the link, the maintenance bytes 102 are also used in the event of link failure or a frequency out of specification.

The advantage of including this information in the preamble of an Ethernet frame means that a level 2 protocol, i.e. a protocol that terminates in the MAC reconciliation sub-layer, can be used to handle this information. Limiting the protocol to level 2 and below permits rapid start-up and restart of the network. For applications with lower timing requirements, it is possible to use the conventional network timing protocol (NTP) or a user application program utilising internet protocol (IP) for transmission to communicate the data structure to the end point nodes.

In addition to information on the data structure and absolute start of transmission, the end nodes 30 also require information that permits them to adjust the start of transmission by the required time to ensure that transmission is substantially synchronised between all network end-nodes 30. In order to obtain this information, each end node 30 determines the round-trip delay to the master node 10. This is preferably performed using a round-trip delay message in the data structure field 101 of the frame. The master node 10 bounces back each message to the respective end node 30. Using these messages, each end node 30 calculates a figure representative of the round trip delay to the master node 10. This round trip delay figure is then communicated to the master node 10. Again this information is preferably contained in the data structure field 101 of the preamble. The master node 10 determines the worst-case delay communicated by the end nodes 30 and sends back this figure to all nodes 30. This figure is indicative of the absolute delay that all end nodes 30 must impose on the synchronous data to ensure synchronisation. Using this maximum time delay figure each end node 30 calculates an adjustment amount for adjusting the start of transmission relative to the absolute start of transmission marker. This is done by subtracting the calculated round-trip delay from the maximum round trip delay communicated by the master node 10 and dividing the resultant figure by two. It will be appreciated that the end nodes 30 may calculate the one-way delay between the master node 10 and end node 30 rather then the round trip delay. In this case, the adjustment made to the start of transmission marker can be obtained simply by subtraction of the individual delay from the maximum delay.

The mechanism for communicating the necessary messages for obtaining the adjustment of the data structure start can usefully be incorporated in the level 2 protocol for interpreting the preamble information 101. Once each end node 30 is in possession of the necessary information, transmission of payload data can commence. This start of payload data transmission is communicated to the end nodes 30 by the master node 10 using an information message. With his message, the end nodes 30 start unpacking payload data received via the network 1 and repacking the data in the designated TDM time frame structure in accordance with the occurrence of the adjusted marker or count indicating transmission start.

Figure 6:
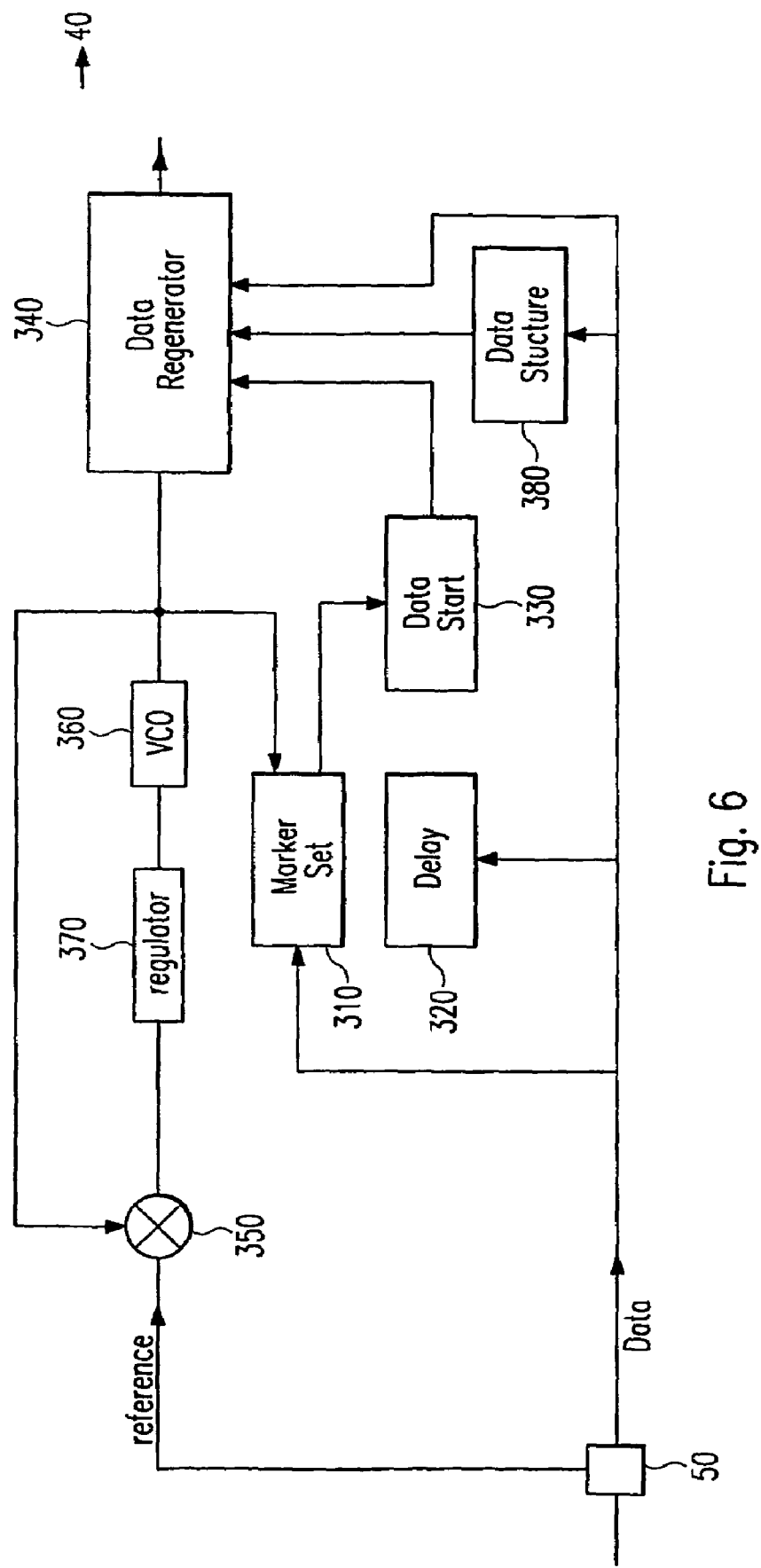
FIG. 6 is a block diagram of receiver circuitry in a network end node in accordance with the present invention.

The structure of receiver circuitry in the end nodes 30 is illustrated functionally in FIG. 6. For ease of representation, two signal lines are indicated entering the node 30 (from left to right in the figure). The upper line in the figure represents the master clock reference signal, while the lower line represents the data. It will be understood that this separation is only functional and the information will in practice be carried on the same physical line. The node 30 includes the clock adjustment circuitry for adjusting data transmission timing to the received master clock reference signal. As described with reference to FIGS. 2 and 3 this is essentially a phase locked loop and includes a comparator 350 that compares an input frequency with a feedback frequency, regulator 370 and voltage-controlled oscillator (VCO) that generates the feedback frequency. The operation of this circuitry is well known to those skilled in the art and will not be described further here. Turning to the data line, there is connected to this a first functional block 310 representing the marker setting circuitry. This block 310 also received the adjusted clock signal that is phase locked to the master clock signal. As already described, in conjunction with the master clock signal this block 310 usefully includes a counter that sets a marker on receipt of timing information from the master node 10. A delay block 320 also received data from the network 1. This block receives the communicated maximum delay figure from the master node 10 and uses this to adjust the unique delay figure calculated by the node using a round trip delay message. This delay block 320 and the marker set block 310 are connected to a data start block 330. The data start block 330 receives the marker indicating absolute start of transmission from block 310 and adjusts this marker position or timing using the delay information from block 320 to generate an adjusted start of transmission marker. A data structure block 380 is also connected to receive data incoming from the network link and serves to extract the data structure information. The data structure block 380, data start block 330 and the phase adjusted clock signal from the VCO 360 are all fed to a regeneration block 340 that also receives the payload data over the network link. Upon identification of a start to transmit message sent by the master node 10, the regeneration block 340 unpacks the payload data from the received data stream and packs this into the new frame structure, each frame being started in synchronisation with the adjusted timing marker such that it is transmitted at the required frequency over the synchronous link to a terminating node 40. The regeneration block preferably includes some kind of buffering circuitry, ideally a FIFO, in which payload data received via the network 1 can be buffered before being packed into a the correct TDM time frame structure and transmitted in accordance with the timing marker.

Figure 7:
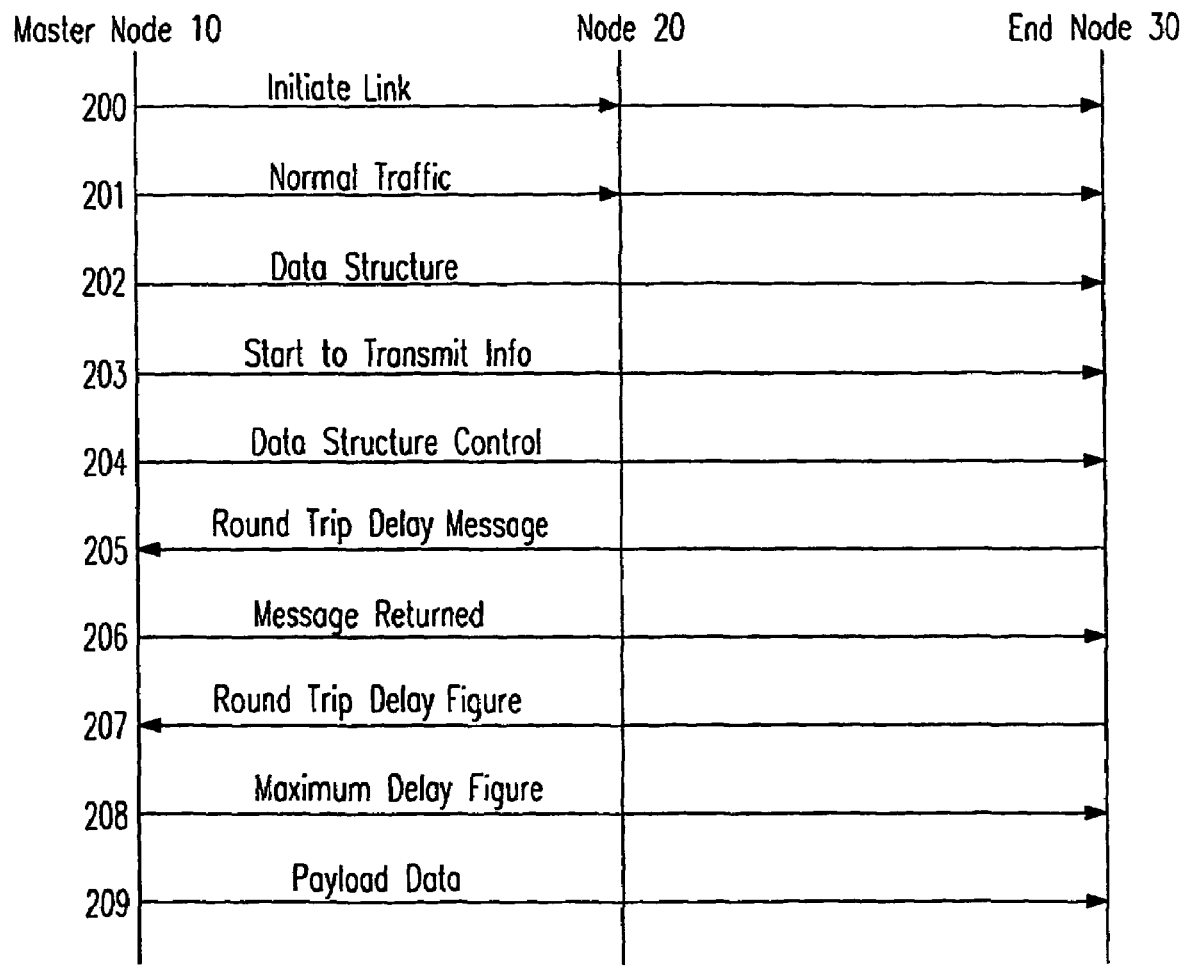
FIG. 7 is a timing diagram illustrating the information exchange between the master and end nodes via intermediate nodes in the network.

FIG. 7 illustrates the exchange of messages between the master node 10 and an end node 30 via intermediate nodes 20 prior to and during transmission of time-sensitive data. At time 200 the master node 10 transmits an initiate message to all nodes in the synchronous link to define and initiate the synchronous data link. This message is only relevant if dynamic set-up of the link is implemented. The intermediate nodes 20 and end nodes 30 set up the synchronised transmission path dynamically on receipt of this message. This means that the internal clocks of all nodes 20, 30 within the defined link are phase locked to the master clock reference signal. At 201 the master node transmits normal traffic. The intermediate end nodes 20, 30 extract the clock from the uplink, adjust the node transmission clock to the extracted clock, or alternatively adjust a transmission clock for a specific link to this extracted clock and then impose the adjusted clock on the downlink. At 202 the master node 10 sends a data structure control message including information on the data structure. This message is propagated through all intermediate nodes 20 and terminates in the end node 30 where the end node prepares for regeneration of the data structure. At 203 the master node 10 sends data structure frequency information. This consists of a burst of protocol frames with fixed inter-frame gaps. The frame repetition rate is indicative of the data structure repetition rate and may be equal to, or a multiple of the synchronous data structure repetition rate. This information burst is propagated by the intermediate nodes 20 to the end node 30. The end node measures the interval between these frames and sets a periodically repeated time marker linked to the reference clock signal, relative to which the data structure defined in the data structure information message is generated using the extracted clock signal. At 204 a data structure control message is sent from the master node 10 via the intermediate nodes to terminate in the end node 30. This message contains maintenance information concerned with restart of the link, a change in data structure or verification of the start of data structure or structure repetition rate. At 205 the end node 30 sends a round trip delay message consisting of a burst of protocol frames identifying the emitting end node 30. This is bounced back to the sending node 30 by the master node 10 at 206. At 207 the round trip delay message calculated by the end node 30 is sent to the master node 10. At 208 the master node 10 sends a maximum round trip delay message to all nodes. This message indicates the longest round trip delay of all nodes received at step 207. Finally at 209 the payload data can be transmitted to all end nodes via the intermediate nodes.

In the above description the master node 10 has been described as a node capable of setting up and reconfiguring the synchronous data link within the packet-switched network. It should be understood, however, that the control functions performed by this node 10 may be performed remotely from a separate node, either within or outside the network. The master node 10 would then be limited to distributing a stable clock signal to nodes in the downlink without the typical control functions normally associated with master nodes. The above description is directed specifically to the transmission of time-sensitive data from a master node 10 to multiple terminating nodes 40 through a packet-switched network 1. It will be understood, however, that described arrangement is not limited to unidirectional transmission, but is intended to transmit in both directions. Hence it will be understood by those skilled in the art that, where not explicitly mentioned, analogous circuitry will be present in the various elements of the link to permit transmission in the opposite direction.

The invention claimed is:

1. A data transmission link for transmitting time-sensitive data, comprising:
 a first node connected to a plurality of end nodes by a broadband packet-switched network, wherein each end node is connected to at least one end terminal, each of said end nodes including:
   timing generation circuitry adapted to generate an output timing signal that is phase locked to a received reference timing signal originating at said first node;
   means for receiving data structure information from said first node and identifying a data structure format from said information for transmitting time-sensitive data between said end nodes and said end terminals;
   a delay signal generator for generating a delay signal in response to delay information received from said first node; and,
   data conversion means communicating with said delay signal generating means, said data structure receiving means and said timing generation circuitry, said data conversion means adapted to receive payload data from said first node and retransmit payload data identified as time-sensitive data in a synchronous manner to said end terminal, wherein the timing of said payload data transmission is adjusted in each end node on the basis of said received timing signal, said received data structure format and said received delay signal, such that all end nodes transmit said payload data substantially simultaneously.

2. The link as recited in claim 1, wherein at least one intermediate node is arranged between said first node and at least one of said end nodes, each said intermediate node including timing generation circuitry adapted to generate an output timing signal that is phase locked to a received reference timing signal originating at said first node, and to propagate said output timing signal to said end node.

3. The link as recited in claim 1, wherein said means for receiving data structure information from said first node further includes:
 means for extracting a data transmission start time marker from said information, said data transmission start marker indicating an absolute start to transmit time for transmitting time-sensitive data between said end nodes and said end terminals.

4. The link as recited in claim 3, wherein said delay signal generator is arranged to adjust the timing of said transmission start time marker by said generated delay.

5. The link as recited in claim 1, wherein each said end node is operative to determine a node transmission delay between said end node and said first node and to communicate this node transmission delay to said first node, and wherein said first node is operative to determine the maximum node transmission delay from each end node and communicate this maximum node transmission delay to all end nodes as delay information.

6. The link as recited in claim 5, wherein said node transmission delay is the round-trip delay between and end node and said first node.

7. The link as recited in claim 1, wherein said timing generation circuitry includes:
   means for extracting a timing reference from a received signal;
   means for phase locking a generated timing signal to said timing reference; and,
   means for imposing said phase locked timing signal on an output signal to generate said output timing signal.

8. The link as recited in claim 1, wherein said network is an Ethernet.

9. A method for transmitting time-sensitive data through a packet-switched network between a first node and a plurality of end nodes, wherein each end node is connected to at least one end terminal, said method comprising the steps of:
   propagating a timing signal through said network from said first node to each said end nodes;
   transmitting a signal indicative of a data structure type from the first node to each end node, said data structure type identifying a data format for transmission from said end node to said end terminals;
   transmitting a delay figure from said first node to each end node, said delay figure being indicative of a maximum transmission delay between said first node and any one of said end nodes; and
   transmitting payload data between said first node and said end terminals, whereby the payload data transmitted between each end node and the corresponding end terminal is formatted in said identified data structure format in accordance with said timing signal and adjusted in dependence on said delay figure such that payload data transmission from each end node to each end terminal occurs substantially synchronously.

10. The method as recited in claim 9, further including the step of generating said delay figure by determining a maximum transmission delay between any end node and said first node.

11. The method as recited in claim 10, further including the steps of:
    sending a delay message from an end node to said first node;
    returning the delay message to the end node;
    calculating a transmission delay based on the return time of said message; and,
    communicating this transmission delay to said first node.

12. The method as recited in claim 9, wherein said step of transmitting a signal indicative of a data structure type includes the step of transmitting a burst of information messages, wherein the interval between each information message is indicative of the transmission repetition rate of the identified data structure from said end node to said terminals.

13. The method as recited in claim 12, further including the steps of:
    in each end node, determining the interval between each information message;
    generating a periodic timing marker corresponding to said interval; and,
    utilising said timing marker to commence transmission of an identified data structure of payload data to said end terminal.

14. The method as recited in claim 13, further including the step of:
    in each end node, adjusting said periodic timing marker in dependence on said delay figure.

15. A node for use in a broadband packet-switched network adapted to receive packet switched-data in a first format from a sending node in said network and transmit synchronous data to an end terminal located outside said network in a second format, said node comprising:
    timing generation circuitry adapted to generate an output signal timing signal that is phase locked to a received reference timing signal;
    means for receiving data structure information indicative of the data structure and repetition rate of said second format;
    a delay signal generator for generating a delay signal in response to delay information received from said first node; and,
    data conversion means communicating with said delay signal generating means, said data structure receiving means and said timing generation circuitry, said data conversion means being adapted to receive payload data in said first data format and retransmit payload data identified as time-sensitive data in said second format, wherein the timing of said payload data transmission is adjusted on the basis of said received timing signal, said received data structure format and said received delay signal.

16. The node as recited in claim 15, further including means for identifying start of data received in said first format, wherein said start of data represents the start of a unit of payload data to be transmitted in said second format.

17. The node as recited in claim 15, wherein said means for receiving data structure information from said first node further includes means for extracting a data transmission start time marker from said information, said data transmission start marker indicating an absolute start to transmit time for transmitting time-sensitive data between said end nodes and said end terminals.

18. The node as recited in claim 17, wherein said delay signal generator is arranged to adjust the timing of said transmission start time marker by said generated delay.

19. The node as recited in claim 15, wherein said node is further adapted to determine a node transmission delay from said sending node.

20. The node as recited in claim 19, wherein said node transmission delay is the round-trip delay between said node and said sending node.

21. The node as recited in claim 15, wherein said timing generation circuitry includes means for extracting a timing reference from a received signal, means for phase locking a generated timing signal to said timing reference and means for imposing said phase locked timing signal on an output signal to generate said output timing signal.

* * * * *